United States Patent
Mok et al.

(10) Patent No.: US 7,729,366 B2
(45) Date of Patent: Jun. 1, 2010

(54) METHOD, APPARATUS AND SYSTEM FOR NETWORK MOBILITY OF A MOBILE COMMUNICATION DEVICE

(75) Inventors: Swee Mean Mok, Palatine, IL (US); Raj Swaminathan, Schaumburg, IL (US); Narayanan Venkitaraman, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 312 days.

(21) Appl. No.: 11/970,981

(22) Filed: Jan. 8, 2008

(65) Prior Publication Data

US 2009/0092133 A1     Apr. 9, 2009

Related U.S. Application Data

(60) Provisional application No. 60/977,125, filed on Oct. 3, 2007.

(51) Int. Cl.
*H04L 12/28* (2006.01)
(52) U.S. Cl. ................... 370/401; 370/349; 370/328
(58) Field of Classification Search ............ 370/401, 370/402, 389, 392, 349, 310.2, 328, 338, 370/395.2
See application file for complete search history.

(56) References Cited

U.S. PATENT DOCUMENTS

| | | | |
|---|---|---|---|
| 2003/0145044 A1* | 7/2003 | Raivisto et al. | 709/203 |
| 2005/0277407 A1* | 12/2005 | Ahn et al. | 455/414.1 |
| 2006/0031459 A1 | 2/2006 | Ahn et al. | |
| 2006/0129700 A1 | 6/2006 | Bopardikar | |
| 2006/0245403 A1 | 11/2006 | Kumar | |
| 2008/0014908 A1* | 1/2008 | Vasant | 455/414.1 |

OTHER PUBLICATIONS

PCT International Search Report; RE: PCT Application #PCT/US2008/077432 Sep. 24, 2008.

* cited by examiner

*Primary Examiner*—Brenda Pham
(74) *Attorney, Agent, or Firm*—Larry T. Cullen

(57) ABSTRACT

A method, device and system for allowing a mobile communication device, such as a DLNA/UPnP device, to continue to communicate with its local network, even when the mobile device leaves or loses contact with the local network. The method includes providing information to a remote access server to create a virtual mobile device in a local network. The virtual device communicates with other devices within the local network as if it is the actual mobile device. The remote access server is configured to route data packets between the virtual device and the mobile device via a second network that does not rely on the mobile nodes connection to the local network. A public IP address of the remote access server provided to the mobile device before the device leaves the local network is used to communicate with the virtual device via an IP-based public network coupled to the local network.

19 Claims, 4 Drawing Sheets

METHOD, APPARATUS AND SYSTEM FOR NETWORK MOBILITY OF A MOBILE COMMUNICATION DEVICE

CROSS-REFERENCE TO RELATED APPLICATION

This application claims priority to the filing date of a U.S. provisional patent application having Ser. No. 60/977,125, entitled "Method, Apparatus And System For Network Mobility Of A Mobile Communication Device", filed on Oct. 3, 2007, which is incorporated herein by reference in its entirety.

BACKGROUND OF THE INVENTION

1. Field of the Invention

The invention relates to exchanging multimedia content and other digital information between a mobile communication device and a local or private network, including network devices belonging to the local network. More particularly, the invention relates to providing network connection establishment using a local network address for a device that is not connected to the local network and mobility for a mobile communication device across networks, such as from a private or local network to an external or public network.

2. Description of the Related Art

Many network communication devices, including mobile (handheld) communication devices, are configured to operate within a network structure according to home networking protocols, such as a set of guidelines established by the Digital Living Network Alliance (DLNA) or the Open Mobile Alliance (OMA). For instance, the DLNA guidelines were established to facilitate the interoperability of consumer electronics (CE) devices (e.g., set-top boxes), personal computer (PC) and other Internet devices, and mobile devices (e.g., mobile phones and personal digital assistants). The DLNA guidelines include protocols that support many computer and Internet-based protocols, including universal plug and play (UPnP™), which is a set of computer network protocols aimed at providing relatively seamless connection between devices, such as within one or more networks. DLNA (or DLNA/UPnP) devices typically are connected to or communicate with a local or private network, since many of the protocols supported by the DLNA work only in a local or private network arrangement. Therefore, when a mobile communication device, such as a mobile DLNA or mobile DLNA/UPnP device, leaves its local network, the mobile communication device no longer is able to communicate with its local network or any of the participating network elements and devices that also are part of the local network.

Conventional methods exist that allow for mobile communication devices, such as UPnP devices or DLNA/UPnP devices, access a local network even when the mobile communication device leaves or loses contact with the local network. One conventional method involves the use of a UPnP bridge between a first local UPnP network and a second UPnP network. This method assumes that the IP addresses in the first and second network are routable in each others domain. The UPnP bridge captures all of the UPnP packets, sent to a standard SSDP port, at the location of the first network, repackages the packets, and sends the repackaged packets to the location of the second network via the Internet. Although the method uses a relatively simple design, it is not applicable to private IP addresses (such as addresses behind a Network Address Translator (NAT)), which are typical of home networks and hotspots. In such conventional methods, such private addresses are routable only in a single local network. Also it does not handle establishing and continuing a session when a device is not connected to a local network or changes IP addresses.

Another conventional method involves the use of a connection-based protocol that is not restricted to a local network, such as Session Initiation Protocol (SIP), between a mobile device connected to a wide area network (WAN) and a controller in the home network. The controller translates messages received via SIP to UPnP and then uses UPnP inside the home network to enable the mobile device access the UPnP devices inside the home network. However, such translations are process intensive and offer only a relatively limited set of features.

Despite these existing methods and systems, there is a need for allowing a mobile communication device, such as a DLNA or DLNA/UPnP mobile communication device, to continue communicating with its local network even when the mobile communication device loses contact with and/or travels beyond the coverage area of its local network.

DETAILED DESCRIPTION

Figure 1:
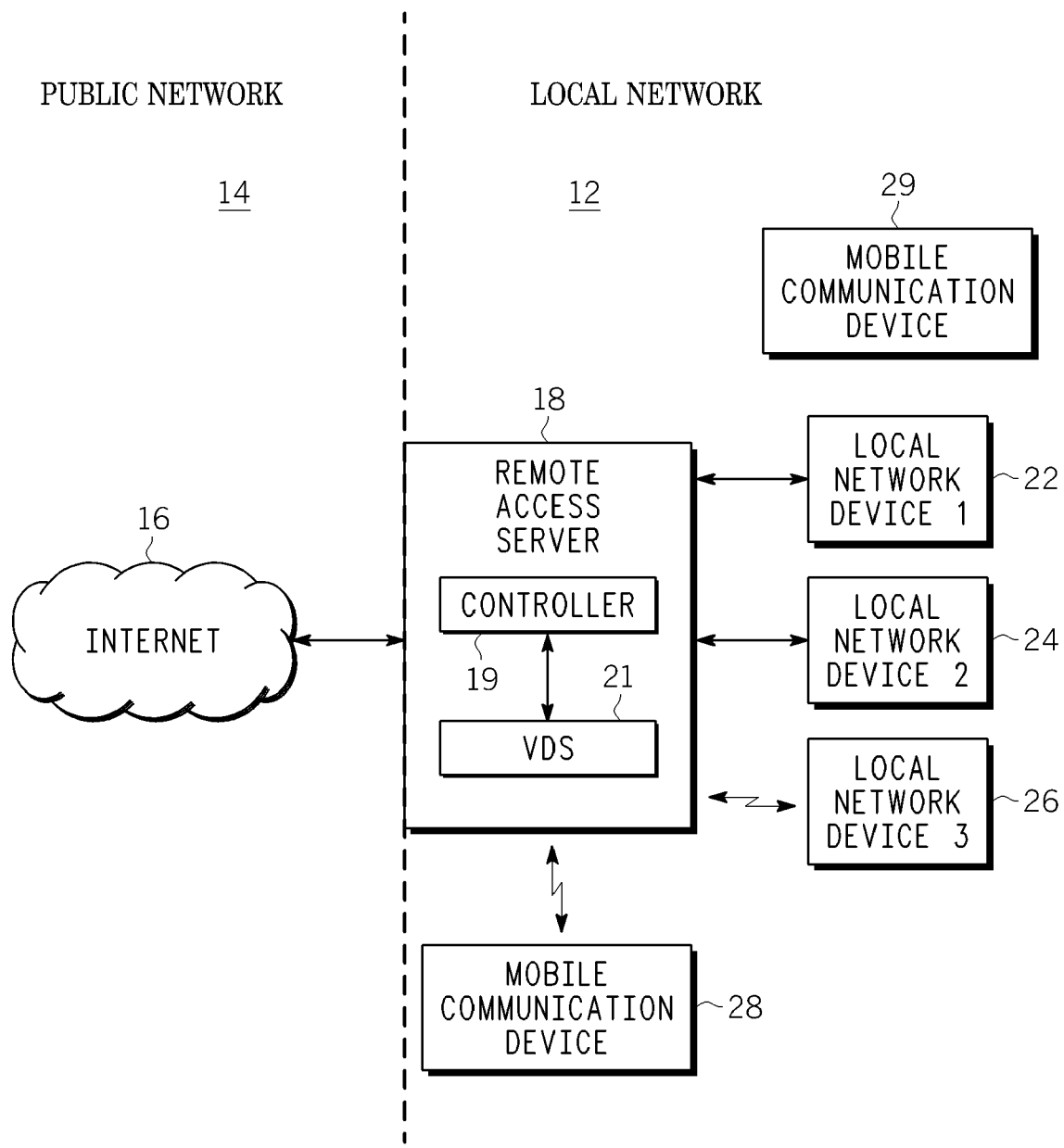
FIG. 1 is a block diagram of a local or private network and a public network, including a remote access server and a mobile communication device configured for network mobility of the mobile communication device, showing the mobile communication device located within and communicating with the local network.

In the following description, like reference numerals indicate like components to enhance the understanding of the network mobility methods, devices and systems through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The devices, methods and systems described herein involve allowing a mobile communication device, such as a DLNA or DLNA/UPnP mobile communication device, to continue to communicate with its local network, for example, a DLNA enabled device in a wireless local area network (WLAN) in a user's home network, even when the mobile communication device leaves or loses contact with the local network. The method provides a communications handoff of local network sessions established using home networking protocols, such as DLNA, using private IP addresses that are routable only in one local network, for a mobile communication device from a local (e.g., WLAN) network to an external network, (e.g., 3G, or WiMAX or a different local network), when the mobile communication device leaves the local network. Also, the method provides the establishment and communication handoff of a network session with a device belonging to a local network using a home networking protocol, such as DLNA, when the mobile is outside the coverage area of the local network or not connected to the local network (e.g., to save battery power). Using an Internet (e.g., TCP/IP) or other appropriate connection (e.g., SMS), a new path between the mobile communication device and the local network is generated, e.g., via the public network. Once the new path is generated and the communications establishment or handoff is made from the local network to the public network, the mobile communication device can access and communicate with devices belonging to the local network without any modification to those devices' local network-compatible applications, e.g., DLNA-compatible applications.

The remote access server (RAS) in the local network includes a controller portion and a virtual device server (VDS) portion. When the mobile communication device is located within the coverage area of a first local network, the mobile communication device can obtain a public identity (such as an IP address and optionally a port, a DNS name, or a phone number) corresponding to the remote access server of the first local network, for instance via a UPnP advertisement message (e.g., a NOTIFY) from the RAS or as part of a DHCP response. While a NOTIFY according to the defined standard has only the IP address, the NOTIFY can be augmented with the phone number or NAT traversal server account information corresponding to the RAS. Alternatively, the remote access capability of the RAS function itself is advertised as a UPnP or DLNA service, and the corresponding information can be obtained by the mobile device by retrieving the description xml file as defined in UPnP standards. The controller in the RAS can also obtain the private IP address corresponding to the mobile communication device using a similar scheme, such as based on a UPnP advertisement message from the mobile device. In other embodiments, the RAS may also obtain other forms of identifiers corresponding to the mobile device, such as a phone number or a DNS name corresponding to the mobile device. They may also exchange credentials to mutually authenticate each other and establish a shared-key using a procedure such as Diffie-Helman.

In one instance, when the mobile communication device loses direct connectivity to the first local network or intends to leave the first local network, the mobile communication device can establish an alternate communication session with the RAS via an alternate link, such as the Internet, a telephone network (such as GSM) or a second local network that is independent of the coverage area of the first local network. The controller in the RAS maps the alternate communication session to a private IP address of mobile device in the first local network and authenticates the mobile device using the key that was established when the mobile device was in the first local network. The VDS portion of the remote access server reserves the existing private IP address of the mobile communication device and hides the fact that mobile device is no longer directly connected to the first local network, thus effectively creating a virtual mobile communication device within the local network.

For example, the VDS portion of the remote access server defends the private IP address by responding to address resolution protocols (ARPs). The VDS portion also generates the periodic messages that are expected from the mobile device in the local network, such as UPnP refresh advertisements, and generates DHCP refresh requests when needed. The VDS portion of the remote access server is configured to route data packets between the virtual mobile communication device and the actual mobile communication device (via the alternate communication session). In this manner, the virtual mobile communication device can communicate with other devices within the local network as if the virtual mobile communication device is the actual mobile communication device.

Referring to FIG. 1, shown is a block diagram of a communication system 10 including a local or private network 12, such as a local area network (LAN) and a public network 14, such as the Internet (shown generally as 16) or other IP-based network. The local network 12 can be coupled to the public network 14 via one or more suitable wired and/or wireless connections.

The local network 12 includes a remote access server (RAS) 18 and one or more local network devices 22, 24, 26 coupled to the remote access server 18. The remote access server 18 can be a residential gateway or other network element that is in the local network, such as devices 22, 24, 26. As will be discussed in greater detail hereinbelow, the remote access server 18 is configured to provide session establishment and continuity for mobile communication devices. The remote access server 18 includes a controller 19 and a Virtual Device Server (VDS) 21. The VDS 21 is configured to host virtual mobile communication devices, as will be discussed hereinbelow.

The local network devices 22, 24, 26 can include one or more local network communication devices, such as network devices configured to operate within a local area network structure, for example, according to a set of guidelines established by the Digital Living Network Alliance (DLNA) and/or that support one or more universal plug and play (UPnP™) protocols or other local network protocols. Such (DLNA or DLNA/UPnP) devices include multimedia content processing devices (such as set-top boxes), computers, printers, cameras, servers, information storage devices, information playback devices and other suitable DLNA and/or DLNA/UPnP devices. The local network devices can communicate with the remote access server 18 via any suitable wired connection (e.g., as shown generally with the devices 22, 24) or wirelessly (e.g., as shown generally with the device 26).

The communications system 10 also can include one or more mobile communication devices 28, 29, which can be any suitable mobile communication device configured to communicate with one or more local network devices via the local network 12. The mobile communication device 28 can communicate with the remote access server 18 wirelessly (as shown) or, alternatively, via an appropriate wired connection. For example, the mobile communication device 28 can be a mobile DLNA or DLNA/UPnP device. The mobile communication device 28 also can have Wi-Fi, Ethernet, WiMax, or other similar IP-based connectivity, although such is not necessary. In FIG. 1, the mobile communication device 28 is shown located within the local network 12, i.e., with the coverage area of the local network 12. Also, FIG. 1 shows a mobile communication device 29, within the coverage area of the local network 12, but not connected to the local network directly. For example, the mobile communication device 29 may be turned off or its local network connection put in sleep mode while (such as in WiFi) to save battery power. In such case, the mobile communication device 29 may connect only occasionally to the local network using the local network connection, or, alternatively, may use a more power-efficient alternate link to maintain connectivity to the RAS.

Figure 2:
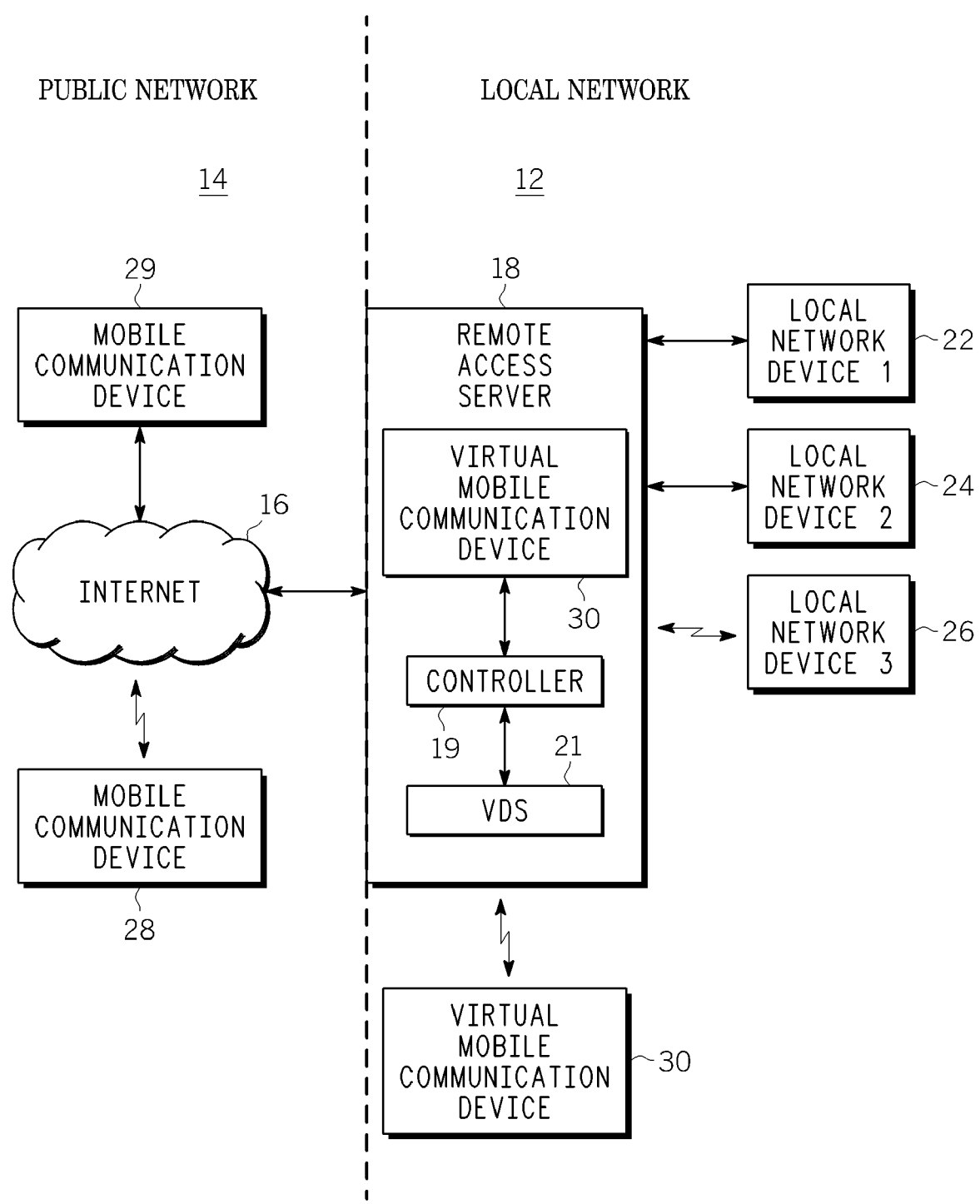
FIG. 2 is a block diagram of a local or private network and a public network, including a remote access server and a mobile communication device configured for network mobility of the mobile communication device, showing the mobile communication device located outside of the operable range of the local network.

Referring now to FIG. 2, with continuing reference to FIG. 1, shown is a block diagram of the communication system 10 of FIG. 1, including the local network 12, the public network 14, the Internet 16, the local network remote access server 18, the local network devices 22, 24, 26, and the mobile communication device 28. However, in FIG. 2, the mobile communication devices 28 and 29 are shown generally as having lost contact with or moved outside of the coverage area of the local network 12.

As discussed hereinabove, when a mobile communications device leaves its local network, the mobile communication device no longer is able to directly communicate with its local network or any of the participating network elements and devices that also are part of the particular local network, since the applicable local network protocols and addresses typically only work in a local or private network arrangement. However, the remote access server 18 is configured to provide network establishment and mobility for the mobile communication device 28 when the mobile communication device 28 moves outside of the coverage area of the local network 12 or when the mobile communication device is not connected to the local network 12. That is, the mobile communication device 28 will still be able to maintain its existing sessions and communicate with devices in its local network 12, using the private IP address of the devices in the local network 12, even though the mobile communication device 28 is not within the coverage area of the local network 12. Devices belonging to the local network 12 such as devices 22, 24, 29, still can establish and/or maintain communication sessions with the local IP address of the mobile communication device using a local network protocol, such as DLNA, even though some mobile communication device devices (e.g., mobile communication devices 28 and 29) are not connected directly to the local network 12. The mobile communication devices 28 and 29 also are configured for such network mobility.

Figure 3:
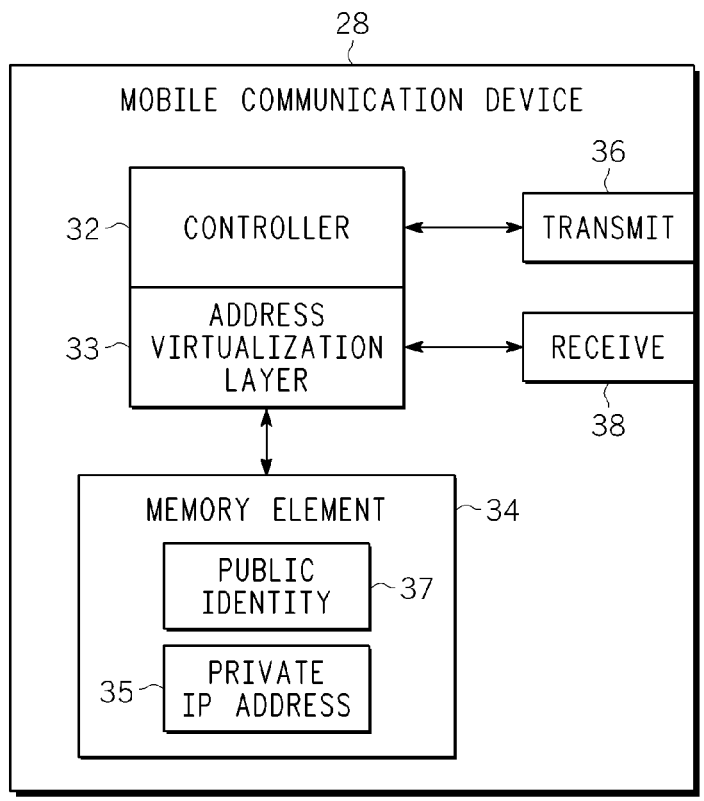
FIG. 3 is a block diagram of a mobile communication device configured for network mobility between a local or private network and a public network.

Referring now to FIG. 3, shown is a block diagram of the mobile communication device 28. Suitable mobile communication devices include any mobile communication device configured for controlling, receiving, processing, storing and/or viewing multimedia content. For example, suitable mobile communication devices can include mobile and handheld computing devices, such as cellular telephones, smart telephones, personal digital assistants (PDAs), wireless handheld devices, digital cameras, music players, laptop personal computers (PCs) and notebook PCs. As discussed hereinabove, in addition to having local network connectivity compatibility (e.g., Wi-Fi), the mobile communication device 28 can be configured to also have alternate connectivity capability, e.g., Ethernet, GSM, WiMax or other suitable connectivity, although such is not necessary.

The mobile communication device 28 includes a controller or processor 32 and a content storage element or memory device 34 coupled to the controller 32. In general, the controller 32 processes multimedia content and other information received and/or generated by the mobile communication device 28. The controller also includes or is coupled to an address virtualization layer 33. In addition to the mobile communication device 28 having the content storage device 34, the controller 32 can include at least one type of memory or memory unit and a storage unit or data storage unit coupled to the controller for storing processing instructions and/or information received and/or created by the mobile communication device 28.

The mobile communication device 28 also can include one or more input and/or output interfaces for receiving and/or transmitting multimedia content and other data and information. For example, the controller 32 and other components in the mobile communication device 28 can be coupled between a transmit interface 36 and a receive interface 38. It should be understood that one or more of the interfaces 36, 38 can be a single input/output interface coupled to the controller 32 and/or other components in the mobile communication device 28.

One or more of the controller 32, the memory element 34 and the interfaces 36, 38 can be comprised partially or completely of any suitable structure or arrangement, e.g., one or more integrated circuits. Also, it should be understood that the mobile communication device 28 includes other components, hardware and software that are used for the operation of other features and functions of the mobile communication device 28 not specifically described herein.

The mobile communication device 28 can be partially or completely configured in the form of hardware circuitry and/or other hardware components within a larger device or group of components. Alternatively, the mobile communication device 28 can be partially or completely configured in the form of software, e.g., as processing instructions and/or one or more sets of logic or computer code. In such configuration, the logic or processing instructions typically are stored in a data storage device, e.g., the content storage device 34 or other suitable data storage device. The data storage device typically is coupled to a processor or controller, e.g., the controller 32. The controller accesses the necessary instructions from the data storage device and executes the instructions or transfers the instructions to the appropriate location within the mobile communication device 28.

With respect to the memory element 34, some end user communication devices typically include or have access to a hard drive or other storage element for recording multimedia content. However, the memory element 34 can be any suitable information storage unit, such as any suitable magnetic storage or optical storage device, including magnetic disk drives, magnetic disks, optical drives, optical disks, and memory devices, including random access memory (RAM) devices and flash memory. Also, although the memory element 34 is shown within the mobile communication device 28, the memory element 34 can be located external to the mobile communication device 28 and suitably coupled thereto.

The mobile communication device 28 includes a private IP address 35. Also, as will be discussed in greater detail hereinbelow, the mobile communication device 28 can obtain a public identity 37, such as an IP address or a NAT-traversal server account name, corresponding to the remote access server 18. Although the private IP address 35 and the public identity 37 are shown within the memory element 34, it should be understood that the private IP address 35 and the public identity 37 can reside in any suitable location within the mobile communication device 28, e.g., within the controller 32.

Figure 4:
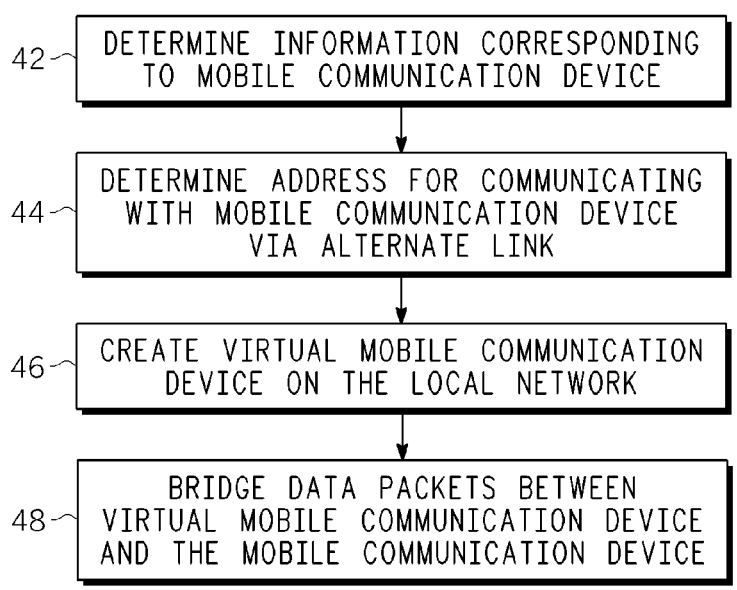
FIG. 4 is a block diagram of a method for providing network mobility for a mobile communication device.

Referring now to FIG. 4, with continuing reference to FIGS. 1-3, shown is a block diagram of a method 40 for providing network mobility for a mobile communication device. The method 40 includes a step 42 of the remote access server determining information corresponding to a mobile communication device, e.g., information related to at least one local area network protocol supported by the mobile communication device. In one embodiment, the local network protocol is UPnP and the remote access server determines the private IP address of the mobile communication device in the local network that is used by a UPnP or DLNA application on the mobile communication device. Such determination may be achieved when the mobile communication device is directly connected to the local network, e.g., by listening to UPnP NOTIFY advertisement messages and obtaining the indicated IP address in the Location: field of the NOTIFY message. Alternatively, the remote access server may obtain the private IP address of the mobile communication device from a message transmitted by the mobile communication device to the remote access server via an alternate link, such as a wide-area network (e.g., WiMAX, 3G). To facilitate such contact, the remote access server may register its reachable address, via the alternate link, in a directory server (such as a dynamic DNS). The remote access server also may advertise this information in the local network. The remote access server also may obtain other information corresponding to the mobile device, such as the Medium Access Control (MAC) address of the local network interface of the mobile communication device, or the port number used by the UPnP application.

The method 40 also includes a step 44 of determining a second address corresponding to the mobile device that can be used for communicating with the mobile communication device via the alternate link. The alternate link is independent of the local area network and is useful outside the coverage area of the local network. In one embodiment, the second address may be determined by receipt of one or more packets, via the alternate link, from the mobile communication device to an address of the remote access server. For example, if a mobile communication device sends an IP packet, via an alternate link such as WIMAX, the source IP address provides the second address. This may be done even when the mobile communication device is in the coverage area of the local area network.

In another instance, the remote access server may receive a message (such as an SMS message) from the mobile node. The message may be sent by the mobile node in response to triggers such as user input or reduction in link quality. The message may contain the second address, such as a public IP address of the mobile node, or an identifier, such as a DNS address or a NAT-traversal server account address that may be used by the remote access server to send a message to the mobile node via the alternate link. Alternatively, the mobile node initiates the session using the publicly reachable identity (such as an IP address/port or a NAT-traversal server account name) of the remote access server. The mobile node may obtain the IP address/port or other reachable identity (such as a DNS name) of the remote access server based on static schemes, such as user configuration, or dynamic schemes, such as from an advertisement from the remote access server in the local network. A second address corresponding to the private IP address of the mobile communication device also may be pre-configured in the remote access server. For example, in a configuration file, a phone number corresponding to the mobile communication device may be configured corresponding to the private IP address of the mobile communication device.

The method also includes a step 46 of creating a virtual mobile communication device on the local network. The virtual mobile communication device performs the role of defending the IP addresses (by responding to ARPs) of mobile communication devices that are not currently connected to the local network (e.g., due to the device not being in the coverage area of the local network, or having its local interface turned off or in idle mode). The virtual mobile communication device also may respond to the messages sent to the MAC address of the mobile communication device. The virtual mobile communication device also may generate periodic refresh messages (such as UPnP device and service advertisements and DHCP requests) on behalf of the mobile communication device. The virtual mobile communication device may obtain the information needed to send the refresh message from an earlier transmission of the message in the local network, such as caching a UPnP NOTIFY message transmitted by the mobile communication device. Alternatively, the virtual mobile communication device may obtain the information from the mobile communication device via the alternate link. The virtual mobile communication device may also trigger a mobile communication device that is in the coverage area of the local network, but not connected to the local network (e.g., due to power save mode) to connect back to the local network when a device in the local network needs to communicate with the mobile communication device.

The method also includes the step 48 of the remote access server bridging between the virtual mobile communication device and the mobile communication device. It includes bridging packets between the communication session corresponding to the mobile communication device in the local network and the communication session with the mobile device via the alternate communication link. This includes receiving packets destined to the mobile communication device's private IP address and sending those packets to the mobile communication device. These packets may be generated by devices inside the local area network or other mobile devices that are outside the local area network that are in communication with the mobile device using the private address of the mobile device.

Bridging also includes receiving packets sent by the mobile communication device 28 via the communication session using the alternate link, and forwarding the packet to the local area network 12. These packets may be destined to the local device in the coverage area of the local area network, e.g., the device 22, or to a second remote mobile device, such as the mobile communication device 29. In the latter case, the remote access server will send the packet via the alternate communication session that it has with the second remote mobile device. The step of bridging may happen automatically, e.g., as soon as the mobile communication device 28 leaves the coverage area of the local network 12 and the remote access server 18 recognizes that the remote access server 18 no longer is able to communicate with the mobile communication device 28 via the local network. Alternatively, the remote access server 18 can bridge all or selected packets, even when the mobile communication device 28 is in the local area network based on request from the mobile communication device 28. The virtual mobile communication device may also send a notification to the mobile device indicating that mobile virtual communication device corresponding to the mobile device has been setup to enable the mobile device transparently leave the local network.

Figure 5:
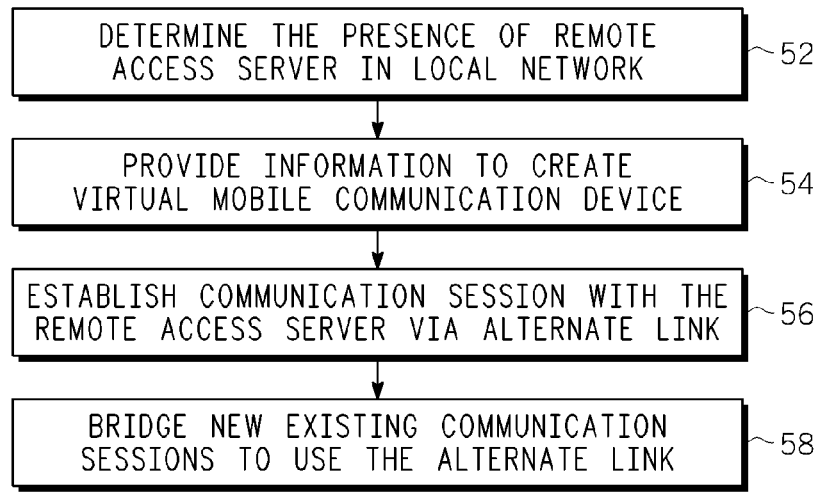
FIG. 5 is a block diagram of another method for providing network mobility for a mobile communication device.

Referring now to FIG. 5, shown is a method 50 for providing connection establishment and network mobility for a mobile communication device. The method 50 includes a step 52 of the mobile communication device 28 determining the presence of a remote access server in the local area network. This may be done dynamically, e.g., based on a UPnP advertisement (such as a NOTIFY message) from the remote access server. Alternatively, this capability can be statically configured in the mobile device.

The method 50 also includes the step 54 of the mobile communication device providing information to the remote access server to create a virtual mobile communication device. Such information includes an address corresponding to the mobile communication device in the local network, such as the private IP address of the mobile device in the local network or the MAC address of the mobile device in the local network. The step 54 may be performed by sending to the local network a UPnP advertisement that includes the private IP address of the mobile communication device. From this packet, the remote access server then may obtain the private IP address of the mobile communication device and the MAC address of the mobile communication device. The UPnP advertisements may be cached by the remote access server to generate refreshes. In some embodiments, additional information, such as description.xml file corresponding to the UPnP devices, and services in the mobile communication device also can be provided to the remote access server.

The method 50 also includes step 56 of establishing a communication session with the remote access server using an alternate link that is independent of the local network. The mobile communication device may initiate a session, such as a Secure Socket Layer (SSL) session, or send UDP packets to the public IP address/port of the remote access server. In another instance, the remote access server may initiate the session by sending a message to the mobile communication device when there is activity corresponding to the mobile communication device in the local network, e.g., upon receiving a message sent to the MAC address of the mobile communication device or a TCP SYN packet sent to the private IP address of the mobile communication device. The remote access server may obtain an address to reach the mobile communication device via the alternate link, such as a phone number or public IP address and port of the mobile communication device. Such address may be obtained from the mobile communication device itself. Alternatively, some information, such as a phone number or a DNS name of the mobile communication device, may be statically configured in the remote access server.

This session may be established securely using a shared key with the remote access server or using the public key of the remote access server. For example, a shared key may be established using a Diffie-Helman method when the mobile node is in the local area network. In another instance, the session may be established by exchanging nonce with the remote access server when the mobile device is in the local area network, and deriving a new key using a hash of the preconfigured shared key and the exchanged nonce values. The mobile device may also exchange the public keys with the remote access server when the mobile device is in the coverage area of the home network.

The method 50 also includes step 58 of the mobile communication device bridging connections corresponding to local applications in the mobile device with devices in the home local network. This step may include receiving packets generated by the device's applications and destined to the private IP address of devices in their home local area network, and forwarding them to the remote access server via the communication session with the public IP address/port of the remote access server. Forwarding can be accomplished by tunneling the packet to the remote access server. The tunnel headers may also be compressed using header compression schemes such that only one IP header remains in the forwarded packet. This may also include receiving packets from the remote access server and sending them to the local applications. Thus, the mobile device hides the fact that it is outside its local network coverage and enables its applications to maintain communication using the private IP address, even when the mobile communication device is not in the local network.

Upon receiving a packet from the remote access server, the mobile communication device may determine if the mobile communication device is in the coverage area of the local network and, if so, to connect to the local area network so that the mobile communication device can start receiving further packets directly via the local network. Upon connecting to the local network, the mobile communication device may send a message to the remote access server informing the remote access server to stop the operation of the virtual mobile communication device corresponding to the mobile communication device. These steps are followed by the mobile communication device returning within the coverage area of the local network after having been outside the coverage area of the local network.

Figure 6:
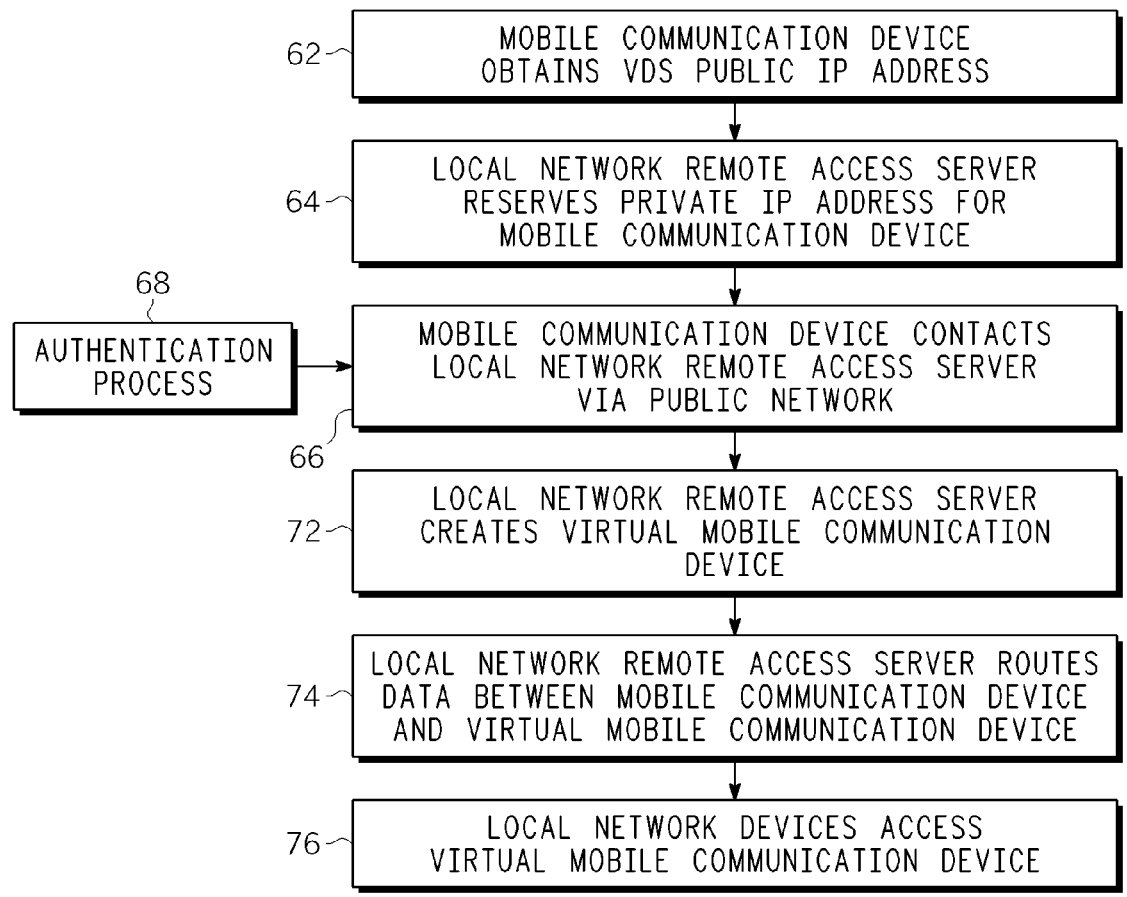
FIG. 6 is a block diagram of yet another method for providing network mobility for a mobile communication device.

Referring now to FIG. 6, with continuing reference to FIGS. 1-3, shown is a block diagram of a method 60 for providing network mobility for a mobile communication device. The method 60 includes a step 62 of the mobile communication device 28 obtaining a publicly-reachable identifier (e.g., an IP address, a login name corresponding to a NAT traversal server, or a DNS name) of the remote access server. The step 62 may be performed dynamically when the mobile communication device 28 is located within and in communication with its local network, i.e., the local network 12 that includes the remote access server 18 issuing the VDS public IP address. Alternately, the step 62 may be performed when the mobile communication device 28 is outside the network, e.g., from a configuration file or as an input from a user.

The method 60 also includes a step 64 of the local network 12 reserving a private IP address for the mobile communication device 28. This happens once the mobile communication device 28 leaves the coverage area of the local network 12 or can happen based on a request from the mobile communication device 28 to create a virtual mobile communication device. The remote access server 18 reserves a private IP address for the mobile communication device 28 for keep-alive time. The remote access server 18 can reserve the new private IP address automatically, e.g., as soon as the mobile communication device 28 leaves the coverage area of the local network 12 and the remote access server 18 recognizes that the remote access server 18 no longer is able to communicate with the mobile communication device 28. Alternatively, the remote access server 18 can reserve the private IP address for the mobile communication device 28 as part of or in response to the mobile communication device 28 obtaining another identity, such as a phone number, or public IP address, i.e., in preparation of the mobile communication device 28 leaving the coverage area of the local network 12.

The method 60 also includes a step 66 of the mobile communication device 28 contacting its local network 12 via an alternate link, in this case, the public network 14. When the mobile communication device 28 decides to leave the local network 12, or when it puts its local network interface in sleep mode, or after the mobile communication device 28 has left the coverage area of the local network 12, the mobile communication device 28 contacts the remote access server 18 of the local network 12 via an alternate link such as an IP-based public network 14. The mobile communication device 28 then identifies itself to the remote access server 18. For example, the mobile communication device 28 uses Wi-Fi, Ethernet, WiMax, or other IP-based connectivity means to connect to the public network 14 and identify itself to the remote access server 18. Alternatively, the mobile communication device 28 can make use of the cellular data network, if available, to connect and identify itself to the remote access server 18. The end user of the mobile communication device 28 can decide the desired manner to access the public network 14, e.g., based on cost or access speed, and configure and operate the mobile communication device 28 accordingly.

As part of the process of the mobile communication device 28 identifying itself to the remote access server 18, an authentication step 68 typically is performed. For example, if the mobile communication device 28 is using WiMax, the authentication step 68 may require an appropriate secure exchange of one or more access tokens, such as a digital signature or a secure hash, between the mobile communication device 28 and the remote access server 18, e.g., in a conventional manner. For example, one or more of the secure tokens can be in the form of a security certificate that contains the International Mobile Equipment Identification (IMEI) number of GSM phones. It should be understood that one or more other authentication methods can be used, e.g., depending on the various IP-based connectivity means used.

The method 60 also includes a step 72 of the remote access server 18 creating a virtual mobile communication device 30 (e.g., as shown in FIG. 2). Upon the successful identification and authentication of the mobile communication device 28 to the remote access server 18, and the recognition of the mobile communication device 28 by the remote access server 18, the remote access server 18 assigns or allocates the previously-reserved private IP address, thus effectively creating the virtual mobile communication device 30 on behalf of the mobile communication device 28.

The method 60 also includes a step 74 of the local network 12 routing data between the mobile communication device 28 and the virtual mobile communication device 30. That is, once the virtual mobile communication device 30 has been created, the remote access server 18 routes data packets from the VDS public IP address of the mobile communication device 28 to the reserved and assigned private IP address of the virtual mobile communication device 30. Similarly, the remote access server 18 routes data packets from the reserved and assigned private IP address of the virtual mobile communication device 30 to the VDS public IP address of the mobile communication device 28. Data packets from the virtual mobile communication device 30 are routed by the remote access server 18 to the public network 14 (e.g., the Internet 16). Also, only data packets from the public network 14 and directed to the virtual mobile communication device 30 are routed by the remote access server 18 to the virtual mobile communication device 30. For example, the remote access server 18 can include an address Listener/Relay Process (LRP), which automatically routes or redirects packets in this manner.

The method 60 also includes a step 76 of one or more local network devices accessing the virtual mobile communication device 30. Once the remote access server 18 begins routing data packets between the VDS public IP address of the mobile communication device 28 and the assigned private IP address of the virtual mobile communication device 30 (i.e., step 74), the local devices (e.g., devices 22, 24, 26) can access and communicate with the mobile communication device 28, through the virtual mobile communication device 30, as if the mobile communication device 28 was located within the local network 12. In this manner, even though the mobile communication device 28 may not be not located within local network 12, the mobile communication device 28 can access and communicate with one or more of the local network devices 22, 24, 26 connected to the local network 12 as if the mobile communication device 28 itself was located within the local network 12.

Much of the communication establishment and network mobility method 60 is made possible by the particular configurations of the remote access server 18 and the mobile communication device 28. As discussed hereinabove, the remote access server 18 includes a VDS portion that is configured to host the virtual mobile communication device 30. Also, the mobile communication device 28 includes a software stack addition to the DLNA/UPnP software stack of the mobile communication device 28. In general, this software stack addition allows the mobile communication device 28 to enable network selection, provide appropriate security, and allow automatic login by the mobile communication device 28 to its local network 12 via the public network 14.

Described hereinbelow is a scenario that serves as an example to illustrate in greater detail the operation of the remote access server 18 and the mobile communication device 28 in providing network mobility for the mobile communication device 28. It should be understood that this scenario is not exhaustive and that other scenarios are possible in which the remote access server 18 and the mobile communication device 28 in provide network mobility for the mobile communication device 28.

In this scenario, John has a WiMax/WiFi-enabled mobile communication device M1, which has a media server. The private IP address of John's mobile communication device M1 is 192.168.1.104. John's wife Jill also is at their home listening to songs served by device M1 to her media player P1, within their local network 12. The private IP address of Jill's media player P1 is 192.168.1.100. John is leaving his home (and their local network coverage area) with his mobile communication device M1, but would like to continue interacting with other local devices in their local network 12, as well as continue to provide service to Jill's media player P1.

While John is at his home (i.e., within his local network coverage area), his DLNA/UPnP enabled mobile communication device M1 is recognized by the remote access server 18 of their local network 12, e.g., based on a NOTIFY message from M1. As such, John's mobile communication device M1 is able to connect to other local network devices (e.g., UPnP devices) within their local network 12. Prior to John leaving the local network 12, John's mobile communication device M1 obtains the remote access server 18 public IP address, e.g., using a static configuration, or from the remote access server 18, e.g., using a message from the remote access server 18. When John leaves the coverage area of their local network 12, the Wi-Fi signal drops off. The discontinued Wi-Fi connection is recognized by the controller 32 in John's mobile communication device M1.

In response, John's mobile communication device M1 connects to the remote access server 18 via an IP-based connection to or communication with the public network 14. The mobile communication device M1 provides the remote access server 18 with a token (e.g., a digital signature) for authentication purposes and also for the remote access server 18 to recognize the mobile communication device M1. It should be understood that, in this instance, John's mobile communication device M1 has knowledge of the public identity of the local network prior to leaving the coverage area of the local network 12.

John's mobile communication device M1 recognizes the connection change from the local network 12 to the public network 14 (e.g., via WiMax) and begins to provide a virtual IP address view to at least the applications in the mobile communication devices bound to the local network. John's mobile communication device M1 also sends outgoing packets, destined to the IP address space of the local network, to the public address of the remote access server 18 and incoming packets from the remote access server 18 to have source address set to 192.168.1.104 (the private IP address of John's mobile communication device M1). In this manner, John can continue interacting with other local devices in their local network 12 using his mobile communication device M1, and John's mobile communication device M1 can continue to provide service to Jill's media player P1.

Continuing with the example scenario, when Jill is not using the media player P1, the controller in Jill's device P1 determines that it can save battery power by putting its local network interface in sleep mode. Jill's device P1 sends a message to the remote access server 18 to create a virtual mobile communication device corresponding to P1. Once the remote access server 18 has instantiated the virtual mobile communication device, the remote access server 18 sends an acknowledgement message to P1, and P1 can stop generating advertisements and, if needed, leave the local network, e.g., by powering offs it WiFi interface or putting the interface into a power save mode. In one instance, the mobile communication device may treat transmission of a message from the virtual mobile communication device to the local network on behalf of the mobile device as an acknowledgement. The virtual mobile communication device sends periodic advertisements to the local network and makes the absence of P1 transparent to the other devices in the local network. When another device, such as device M1, tries to contact device P1 using the local address of device P1, the remote access server 18 informs device P1 and sends a message to device P1 via the alternate link, e.g., via an SMS message asking device P1 to connect to the local network. Alternatively, the remote access server 18 tunnels a packet destined to device P1 to the public IP address corresponding to device P1, which, in turn, triggers device P1 to attempt to connect back into the local network. Once the device joins the local network again (by powering up its WiFi interface or putting it into active mode), the device can directly communicate with local network devices via the local network. The device also may send a message in to stop the virtual mobile communication device corresponding to the mobile acting or bridging packets on behalf of the mobile communication device.

As discussed hereinabove, the devices, methods and systems described herein provide seamless mobility for mobile communication devices with their local network and local network devices, even when the mobile communication device leaves the coverage area of the local network. For example, mobile communication devices can access set-top boxes and other local device within their local network via an IP-based connection to a public IP-based network, such as the Internet, in a secure and seamless manner. Therefore, multimedia content stored in a home network, such as a DLNA/UPnP network, can be shared with one or more multiple mobile communication device end users outside of the home, i.e., outside of the coverage area of the local network.

The method shown in FIGS. 4-6 may be implemented in a general, multi-purpose or single purpose processor. Such a processor will execute instructions, either at the assembly, compiled or machine-level, to perform that process. Those instructions can be written by one of ordinary skill in the art following the description of FIGS. 4-6 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the network mobility methods, devices and systems herein described without departing from the spirit and scope of the invention as defined by the appended claims and their full scope of equivalents.

The invention claimed is:

1. A method for communicating between a local network and a mobile communication device, comprising the steps of:
    determining by a remote access server a first set of information corresponding to the mobile communication device, wherein the first set of information corresponding to the mobile communication device includes information related to at least one local network protocol supported by the mobile communication device;
    determining by a remote access server an alternate address corresponding to the mobile communication device, wherein the mobile communication device can be reached using the alternate address even when the mobile communication device is not located within the operable range of the local network;
    creating a virtual mobile communication device by the remote access server using the first set of information, wherein the virtual mobile communication device is configured to act as the mobile communication device, wherein the virtual mobile communication device is compatible with at least one local network protocol even when the mobile communication device is not in communication with the local network; and
    bridging the transmission of data packets between the virtual mobile communication device and the alternate address corresponding to the mobile communication device.

2. The method as recited in claim 1, wherein the step of determining the first set of information includes receiving a UPnP advertisement message in the local network from the mobile communication device.

3. The method as recited in claim 1, wherein the step of determining the alternate address includes:
    receiving a message in the local network with having the alternate address of the mobile communication device,
    looking up a configuration file providing a mapping between the local address and the alternate address,
    registering by the remote access server an address with a network server, and
    receiving a message sent by the mobile communication device using the network server, wherein the message includes the alternate address of the mobile communication device.

4. The method as recited in claim 1, wherein the step of creating the virtual mobile communication device includes:
    generating by the remote access server an advertisement using the first set of information,
    receiving by the remote access server a packet destined to the address of the mobile communication device in the local area network,
    generating by the remote access server a message in response to the received packet sent to the address of mobile communication device on the local network,
    transmitting by the remote access server the received packet using the alternate address of the mobile communication device, and
    reserving by the remote access server an IP address corresponding to mobile communication device in the local area network.

5. The method as recited in claim 4, wherein the step of generating a message includes sending the message to the alternate address of mobile communication device and sending the message to the sender of the packet received by the remote access server.

6. The method as recited in claim 1, wherein the local network protocol is at least one of a set of guidelines established by the Digital Living Network Alliance (DLNA), and at least one protocol from a set of universal plug and play (UPnP) protocols.

7. The method as recited in claim 1, further comprising a step of determining by the remote access server that a packet corresponding to the mobile communication device in the local network need not be transmitted to the alternate address of mobile communication device.

8. The method as recited in claim 1, wherein the bridging step includes sending a packet destined to the address of the mobile communication device in the local area network to the alternate address of the mobile communication device.

9. The method as recited in claim 1, wherein the bridging step includes receiving by the remote access server data packets from the mobile communication device via an alternate communication link outside of the local network and sending the received packets via the local network.

10. A mobile communication device, comprising:
a controller configured to determine the presence of a remote access server in a local network,
wherein the controller is configured to provide to the remote access server a first set of information including at least a first address corresponding to the mobile communication device, wherein the remote access server is configured to use the first set of information to create a virtual mobile communication device that is configured to act as the mobile communication device in such a way that is compatible with at least one local network protocol even when the mobile communication is not in communication with the local network,
wherein the controller is configured to couple the mobile communication device to the remote access server via a second network using a second address, and to provide the second address to the remote access server,
wherein the mobile communication device further comprises an address virtualization layer coupled to the controller, wherein the address virtualization layer is configured to enable applications bound to the address of the mobile communication device in the local network to continue operating using the address of the mobile communication device in the local network even when the mobile communication device is not connected to the local network.

11. The device as recited in claim 10, wherein the at least one local network protocol is at least one of a Universal Plug and Play (UPnP) protocol and a Digital Living Network Alliance (DLNA) protocol, and wherein the first set of information includes information for creating a UPnP advertisement corresponding to the mobile communication device.

12. The device as recited in claim 10, wherein the address virtualization layer is configured to expose a local area network IP address of the mobile communication device to at least one application in the first mobile communication device when the first mobile communication device is not located in the operable range of the local network, and to instruct the controller to transmit packets sent by the at least one application exposed with the local area network IP address of the first mobile communication device to the remote access server using an alternate communication link outside of the local network.

13. The device as recited in claim 10, wherein the controller is configured to determine that a virtual mobile communication device will handle communication corresponding to the mobile communication device and stop generation of advertisements in the local network, wherein stopping generation of advertisements includes turning off the local network interface and switching the local network interface into a power save mode.

14. The device as recited in claim 10, wherein the controller is configured to receive a message from the remote access server via an alternate communication link outside of the local network, and start communicating directly via the local network communication link.

15. A method for providing continued communication between a local network having an operable range and a mobile communication device that has left the operable range of the local network, wherein the mobile communication device is configured to connect to a public network, wherein the method comprises the steps of:
providing a public address to the mobile communication device when the mobile communication device is located within the operable range of the local network and communicating with the local network;
creating a virtual mobile communication device configured to communicate with the local network; and
routing network communications between the virtual mobile communication device and the mobile communication device via the public network when the mobile communication device is coupled to the local network via a public network based connection between the mobile communication device and the public network,
wherein the network communications between the mobile communication device and the virtual mobile communication device allow local network communications to be routed between the local network and the mobile communication device via the virtual mobile communication device in such a way that the mobile communication device can communicate with the local network as if the mobile communication device was within the operable range of the local network and communicating with the local network.

16. The method as recited in claim 15, wherein the mobile communication device has a private IP address, and wherein the creating step includes reserving the private IP address for the mobile communication device when the mobile communication device leaves the local network.

17. The method as recited in claim 15, wherein routing step includes bridging data packets between the public IP address of the mobile communication device and the private IP address virtual mobile communication device.

18. The method as recited in claim 15, further comprising the step of authenticating the mobile communication device when the mobile communication device is coupled to the local network via an IP-based connection between the mobile communication device and the IP-based public network using the public IP address.

19. The method as recited in claim 15, wherein routing step includes routing data packets from the public IP address of the mobile communication device to the virtual mobile communication device.

* * * * *